UNITED STATES PATENT OFFICE.

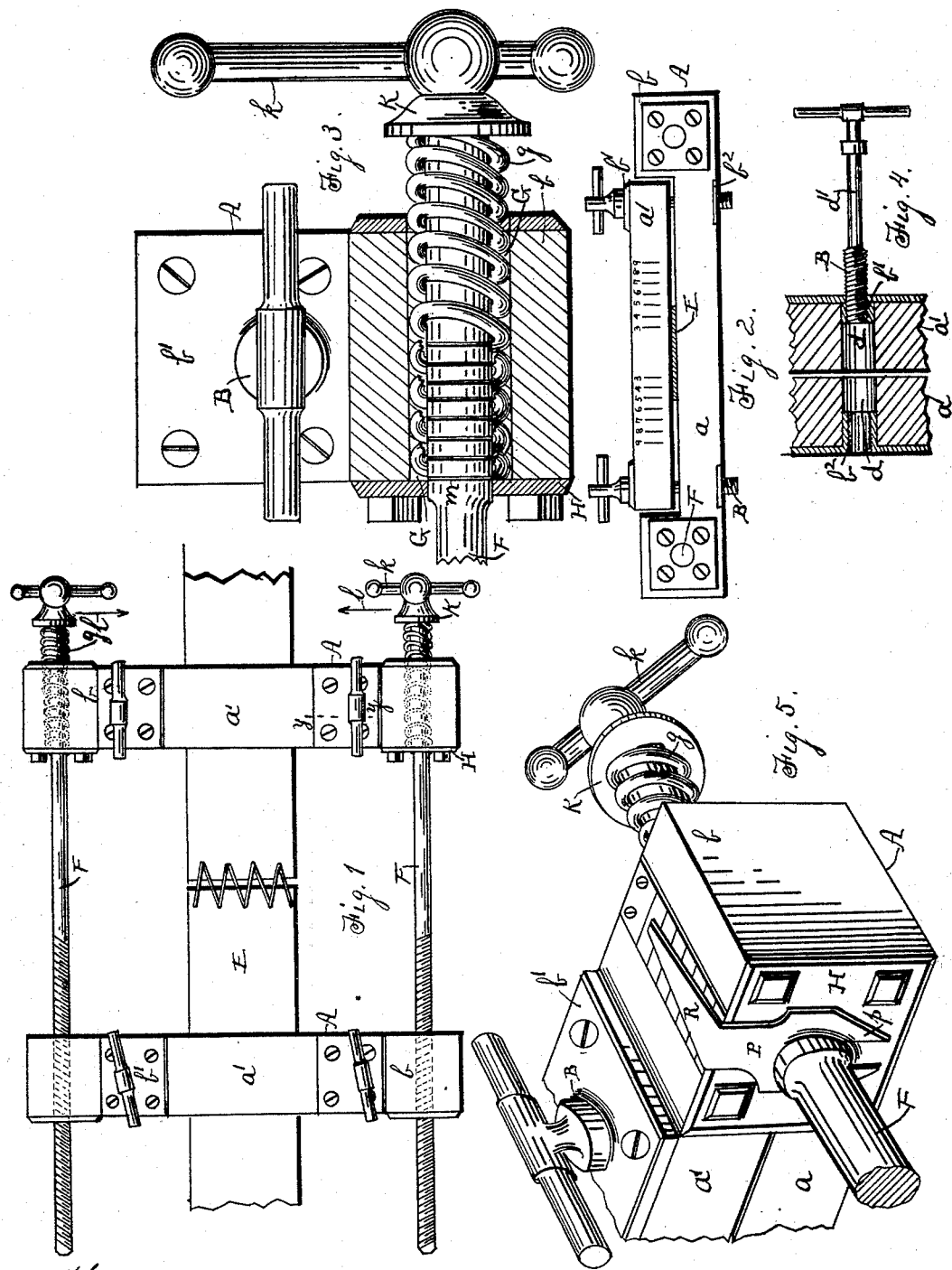

ENOCH PAGE, OF LANCASTER, PENNSYLVANIA.

BELT-STRETCHER.

SPECIFICATION forming part of Letters Patent No. 485,216, dated November 1, 1892.

Application filed April 27, 1892. Serial No. 430,817. (No model.)

*To all whom it may concern:*

Be it known that I, ENOCH PAGE, a citizen of the United States, residing at Lancaster, in the county of Lancaster and State of Pennsylvania, have invented certain Improvements in Belt-Stretchers, of which the following is a specification.

My invention relates to that class of devices employed in shops or factories for tightening up the belts used for communicating motion to the shafts.

Heretofore belt-stretchers have been made having springs for determining the strain put upon the belt placed as links in the tightening-screws between the clamps. For this purpose the tightening-screws are divided between the clamps and the springs hooked or jointed to the contiguous ends of the sections of the screws. This construction has been found to be objectionable in use, for the reason that the stretcher is so limber as to render its attachment to the ends of the belt exceedingly difficult, frequently requiring the employment of two men where one could easily have attached a stretcher having rigid tightening-rods. Another objection is that the insertion of the springs between the clamps so lengthens the stretcher as to render its employment in certain positions of the ends of the belt impossible by reason of the close proximity of different parts of the machinery or framing, while in many cases it also prevents the ends of said belt from being drawn together as much as is necessary to properly tighten the belt.

The objects of my invention are, first, to provide a belt-stretcher with rigid unbroken tightening-screws having attachments by which the strain thereon may be determined, and, second, to so construct the clamps that the ends of the belt can be secured therein without entirely detaching any of the parts of said clamps.

My invention is illustrated in the accompanying drawings, forming a part of this specification, in which—

Figure 1 is a top or plan view of one of my belt-stretchers, showing the clamps engaged with the ends of a belt. Fig. 2 is an outer edge view of one of the clamps. Fig. 3 is an enlarged horizontal section of one of the spring-supporting blocks. Fig. 4 is a vertical section on the line $y\ y$ of Fig. 1, showing the construction of the screws connecting the clamps and of the sockets in which they work. Fig. 5 is an enlarged perspective view of one of the spring-supporting blocks, showing a modified construction for indicating the pressure on the springs.

Similar letters indicate like parts throughout the several views.

Referring to the details of the drawings, A indicates two clamps, composed of base-pieces $a$ and clamp-pieces $a'$. Each base-piece $a$ has a block or enlargement $b$ formed on the upper surface of the ends, so as to leave a recess between them, in which is located the clamp-pieces $a'$. The clamp and base-pieces are secured together by set-screws B, adapted to engage T-nuts $b'\ b^2$, secured, respectively, to the top and bottom of the clamp and base pieces. The T-nuts only extend partially through the clamp and base pieces, and the openings $d$, connecting them, are larger than screws B, on which the threads are formed externally. By this construction an end of each clamp can be swung around the neck $d'$ of one of the set-screws B when that at the other end is drawn up, as shown in Fig. 4, so as to permit the end of the belt to be easily engaged between the clamp and base pieces.

On the vertical faces of each clamp-piece there is a series of numbers arranged on each side of the center, as shown in Fig. 2, to indicate the points at which the edges of belts E of various sizes are to rest, so as to have the center of the belt coincide with the center of the clamp to equalize the strains on the tightening-screws which draw the clamps together.

F represents the tightening-screws, which pass through the blocks or enlargements $b$ of the base-pieces $a$, the threaded ends of the screws engaging threads in the blocks $b$ of one of the base-pieces and the stems passing loosely through enlarged apertures G, formed in the blocks $b$ of the other base-piece. The portions of the stems engaging apertures G are encircled by coiled springs $g$, one end of each of which bears against a plate H, covering the inner ends of each aperture G, and the other against a boss K, formed on the stem adjacent to the handle $k$. Both screws are double-threaded, one being a right and the other a left handed screw-rod, so that when the clamps are drawn toward each other the handles $k$ are turned in opposite directions, as indicated by arrows $l$ in Fig. 1, thus preventing the rocking of the clamps with the ends of the belts under the strain put upon them, as would be the case were the handles turned in the same direction. The inner ends of the portions of the stems encircled by springs $g$ have circles $m$ cut around them, as shown, where the spring $g$ is cut away in Fig. 3. As the tension is put upon the screws in drawing up the ends of the belts, the strain on said screws draws the marked portions out from the heads, so that the number of circles $m$ which appear indicate the amount of strain on the belt.

In Fig. 5 there is shown a different way of indicating the tension on the belt. In this case there is a post P, having a yoke $p$ thereon, which engages a recess or groove in the stem of the screw, and on the upper end of the post there is formed a pointer R, that extends across an index-plate on the top of block $b$.

The great advantages in my belt-stretcher are that it is so simple and compact in construction that it can be readily and easily handled by one person; that while using the springs to indicate the tension on the belt the clamps are at the same time rigidly connected together, which greatly increases the ease with which the stretcher is connected with the belt; that it is not necessary to detach or remove any of the parts in connecting it with the belt, and that all rocking of the mechanism is prevented while it is being operated by reason of the construction of the screws.

Having thus described my invention, what I claim as new, and desire to secure by Letters Patent, is—

1. In a belt-stretching device, the combination, with clamps for holding the ends of the belt, of rigid tightening-screws connecting the clamps, springs having a bearing for one end on said screws and for the other end on one of the clamps, and indicators on the tightening-screws adapted to show the pressure on the springs by the distance said indicators are drawn from one of the clamps, substantially as and for the purpose specified.

2. In a belt-stretcher, the combination, with clamps for holding the ends of the belt, of rigid tightening-screws connecting the clamps and having a series of circumferential grooves cut in the parts thereof engaged in one of the clamps, and springs having a bearing for one end on said screws and for the other end on one of the clamps, substantially as and for the purpose specified.

3. In a belt-stretching device, the combination, with recessed clamps for holding the ends of the belt, of tightening-screws passing through said recesses, springs coiled about said tightening-screws and having one end bearing against plates covering the ends of the recesses and the other against bosses on said screws, and a device for registering the pressure on the springs, substantially as and for the purpose specified.

4. In a belt-stretching device, the combination, with the tightening-screws, of clamps formed of two perforated pieces, stationary nuts inserted in the outer ends of the perforations and extending but partially through the same, the diameter of the nut-openings being less than that of said perforations, and set-screws adapted to engage the nuts and having the threads formed externally thereon, said screws being threaded only at their lower ends and having elongated necks above the threaded portions, substantially as and for the purpose specified.

ENOCH PAGE.

Witnesses:
JACOB HALBACH,
WM. R. GERHART.